Nov. 14, 1950
F. D. JONES ET AL
2,529,842
BAILING PRESS TAIL BOARD
Filed March 23, 1945
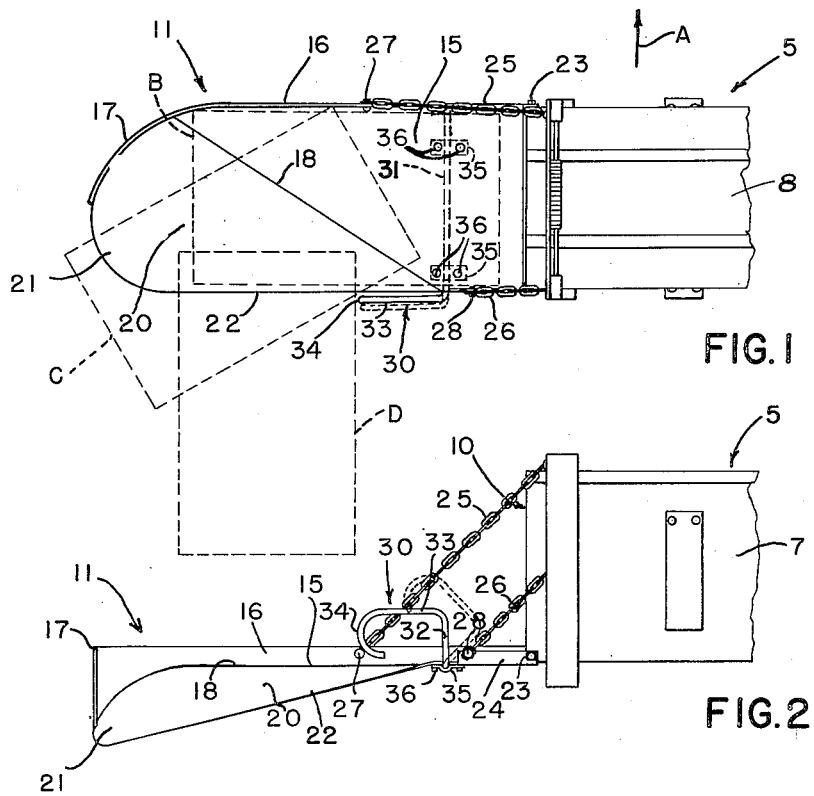
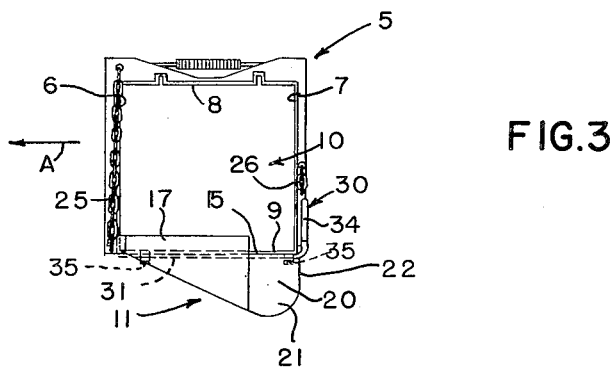
INVENTORS
FRANK D. JONES
JAMES R. WEST
BY
WITNESS.

Patented Nov. 14, 1950

2,529,842

UNITED STATES PATENT OFFICE 2,529,842

BALING PRESS TAILBOARD

Frank D. Jones and James R. West, Ottumwa, Iowa, assignors to Deere Manufacturing Co., a corporation of Iowa Application March 23, 1945, Serial No. 584,298

10 Claims. (Cl. 193—43)

The present invention relates generally to pick-up balers of the type adapted to travel across a field, picking up hay, straw, or the like, forming the latter into bales and discharging the bales upon the ground. More particularly, our invention relates to that class of balers in which the bale case is disposed transversely relative to the direction of travel of the implement, and has for its principal object the provision of a novel and improved tail board, which serves as a chute to discharge the completed bales upon the ground.

One example of this type of pick-up baler is disclosed in Patent 2,318,229 granted May 4, 1943, to Frank D. Jones, one of the present applicants, which merely provides for discharging the bales laterally from the end of the bale case. Another example is disclosed in U. S. Patent 2,484,890, in which a tail board is added to the bale case, but which also provides for discharging the bales laterally outwardly over the end of the tail board.

We have found that there is a disadvantage in discharging the bales in this manner, for they tend to bounce and roll along the ground, particularly in hilly terrain, so that the bales are not disposed in any orderly manner which would facilitate their collection. Furthermore, we have found that some bales have broken open due to this rough handling.

One of the objects, therefore, of the present invention relates to the provision of a tail board which is adapted to lay the discharged bales upon the ground in a straight row, with all the bales discharged substantially in alignment. Another object relates to the provision of a tail board which will lay the bales on the ground without causing them to bounce or roll to any considerable extent, thereby eliminating the danger of the bales breaking open.

More specifically, it is an object of our invention to provide a novel tail board which will receive the completed bales from the end of the bale case in a direction transversely to the movement of the implement, which will turn the bales approximately 90 degrees, and which will drop them from the rear edge of the tail board with the major axis of the discharged bale extending in a fore and aft direction. We have found that when the bales fall upon the ground in this position, there is very little tendency for them to roll after landing on the ground, since their momentum is in the same direction as their major axes and is not sufficient to cause them to turn end over end. When bales are discharged transversely of the direction of momentum, they tend to roll much more easily, rotating about their major axes.

Still another object relates to the provision of a tail board having raised guides for turning the bales through 90 degrees, and a related object pertains to the provision of means for adjusting the spacing between these guides to obtain the desired action under various conditions of operation.

These and other objects and advantages of our invention will be apparent to those skilled in the art after a consideration of the following description, in which reference is had to the drawings appended hereto, in which Figure 1 is a plan view of the outer end portion of a bale case and the tail board attached thereto, embodying the principles of the present invention, and showing in solid and in dotted lines two positions of adjustment of the rear guide, respectively;

Figure 2 is a rear elevational view of the device shown in Figure 1, showing in solid and in dotted lines two laterally adjusted positions of the rear guide, respectively; and Figure 3 is an end elevational view.

Referring now to the drawings, the pick-up baler is represented by the outer end of a bale case, indicated generally by reference numeral 5 and comprising a pair of front and rear vertical walls 6 and 7 and a pair of top and bottom walls 8 and 9, defining a rectangular passage through which the bales of hay, straw, and other crops are forced by the baling mechanism (not shown) in a manner well known to those skilled in the art.

The baler moves in the direction indicated by arrows A in Figures 1 and 3, with the bale case 5 disposed transversely of the direction of movement. The outer end of the bale case 5 is open as indicated at 10 for the purpose of discharging the bales, and a tail board 11 is provided outwardly of the bale case 10, to receive the bales therefrom.

The tail board 11 comprises a generally horizontal floor plate 15 disposed in the plane of the bottom wall 9 or slightly below the latter and extending laterally outwardly from the bale case 5. A guide 16, in the form of a wall plate raised above the surface of the floor plate 15, extends outwardly along the forward edge of the floor and curves rearwardly at 17 around the outer end of the floor plate 15, which is also curved to conform therewith.

The outer and rearward portion of the tail board is sloped downwardly along a line 18 and lies in a downwardly and outwardly inclined plane which intersects the plane of the horizontal floor plate 15 along the oblique line 18. This inclined portion of the floor plate is indicated by reference numeral 20. The outer rear corner of the inclined portion 20, also curved, is indicated at 21 and the rear edge 22 of the inclined portion 20 is disposed substantially in alignment with the rear wall 7 of the bale case.

The inner end of the tail board 11 is pivotally connected to the outer end of the bale case 5 by means of a pair of fore and aft aligned bolts 23, which are inserted through suitable openings in the guide wall 16 and in a short vertical flange or wall 24 at the inner end of the rear edge of the horizontal portion 15, respectively. The tail board is supported from the bale case by a pair of chains 25 and 26. The front chain 25 is connected by a bolt 27 to the guide wall 16 and inclines upwardly and inwardly therefrom and is secured to the upper portion of the bale case. The rear chain 26 is secured by a bolt 28 to the rear flange 24 and is inclined upwardly and inwardly to a point of connection with the side wall 7 of the bale case.

A second raised guide 30 is provided along the rear edge 22 of the inclined portion 20 and comprises a metal rod having a portion 31 extending rearwardly beneath the floor plate 15, turning upwardly to provide a vertical portion 32 behind the rear edge 22, then turning laterally outwardly to provide a guide rail portion 33 elevated above the rear edge 22, and having an outer end portion 34 curving downwardly and inwardly. The guide 30 is supported beneath the floor plate 15 by means of a pair of fore and aft spaced straps 35, which underlie the portion 31 and are clamped against the lower side of the plate 15 by bolts 36. The guide member 30 can be adjusted relative to the tail board by first loosening the bolts 36, after which the guide 30 can be shifted rearwardly or forwardly by sliding the portion 31 through the clamping straps 35, to increase or decrease the spacing between the guide rail 33 and the front guide wall 16 as indicated by dotted lines in Figure 1. The guide member 30 can also be adjusted angularly about the axis of the supporting portion 31. This provides a limited amount of lateral adjustment of the curved end 34 relative to the floor, as indicated in dotted lines in Figure 2.

During operation, the bales move laterally outwardly through the opening 10 and slide along the horizontal floor 15 in the position indicated at B in dotted lines in Figure 1, until the outer end of the bale engages the curved portion 17 of the wall 16. Further movement of the bale causes the outer front corner thereof to slide against the curved wall 17, until the center of gravity of the bale moves across edge 18, causing the bale to begin to slide rearwardly and outwardly along the inclined surface 20, as indicated at position C. By this time, the rear side of the bale bears against the downwardly curved end 34 of the rear guide rod 30, which acts as a fulcrum so that further outward movement of the bale, bearing against the fulcrum 34 causes the bale to swing around still further, until the bale is substantially parallel with the direction of movement of the baler. The bale is shown in dotted lines in position D in which it is sliding rearwardly over the rear edge 22 of the inclined floor 20 so that the bale falls to the ground with its major axis pointing fore and aft. In this position, the momentum of the bale due to the forward movement of the baler is not sufficient to cause the bale to tumble end over end and therefore it comes to rest quickly and with very little bouncing or rolling. This alignment of the bales upon the ground facilitates the collection of the bales, particularly when mechanical elevating devices are used for picking up the bales and loading them on a wagon or truck.

The tail board can be swung upwardly about the axis of the aligned bolts 23 to a vertical position in order to reduce the over-all width of the machine for transport purposes.

We claim:

1. A tail board for a pick-up type baler having a bale case disposed transversely of the direction of movement in the field, said tail board comprising a floor extending laterally from the discharge end of said bale case and having substantially straight and parallel front and rear edges, the inner or receiving portion of said floor adjacent said bale case being generally horizontal, the outer portion of said floor being inclined downwardly and rearwardly, and a raised guide along the rear edge of said floor comprising a member extending along said rear edge and spaced above the latter, the outer end of said member turning downwardly to serve as a fulcrum about which the bales are turned as they slide down said inclned portion of the floor.

2. A tail board for a pick-up type baler having a bale case disposed transversely of the direction of movement in the field, said tail board comprising a floor extending laterally from the discharge end of said bale case and having substantially straight and parallel front and rear edges, the inner or receiving portion of said floor adjacent said bale case being generally horizontal, the outer portion of said floor being inclined downwardly and rearwardly, a guide element raised above said floor extending along the forward edge of the latter and turning rearwardly at the outer end for turning the bales rearwardly, means mounting said guide element on the tail board and a second guide element raised above said floor extending along the rear edge of the latter along part of said inclined portion, and means mounting said second guide element on the tail board, whereby the bales are turned longitudinally of the direction of movement of said baler as they are discharged from said tail board.

3. A tail board for a pick-up type baler having a bale case disposed transversely of the direction of movement in the field, said tail board comprising a generally horizontal floor extending laterally from the discharge end of said bale case, the outer portion of said floor being inclined downwardly and rearwardly, a raised guide along the rear edge of said floor extending along said inclined portion, the outer end of said guide serving as a fulcrum about which the bales are turned as they slide down said inclined portion of the floor, means mounting said guide on the floor for adjustment fore and aft relative to said floor, and means for securing said guide rigidly relative to said floor in adjusted position.

4. A tail board for a pick-up type baler having a bale case disposed transversely of the direction of movement in the field, said tail board comprising a generally horizontal floor extending laterally from the discharge end of said bale case, the outer portion of said floor being inclined downwardly and rearwardly, a raised guide along the rear edge of said floor extending along said inclined portion, and means for adjustably mounting said guide on said tail board comprising a supporting shaft attached to said guide and extending forwardly under said floor and shiftable fore and aft and also angularly about the major axis of said shaft to shift said guide, and means for securing said shaft relative to said floor in adjusted position.

5. A tail board for a pick-up type baler having a bale case disposed transversely of the direction of movement in the field, said tail board comprising a generally horizontal floor extending laterally from the discharge end of said bale case, the outer portion of said floor being inclined downwardly and rearwardly, a raised guide along the rear edge of said floor comprising a rod having a first portion extending rearwardly under the floor, a second portion joined to the first portion turning upwardly behind the floor to an elevated point, and a third portion joined to the second portion and extending laterally outwardly along the rear edge of said floor generally at the level of said elevated point and having its outer end turned downwardly to serve as a fulcrum about which the bales are turned as they slide down said inclined portion of the floor, and means mounting said first rod portion on the floor.

6. The combination set forth in claim 5, including the further provision in said rod-mounting means of means providing for fore and aft sliding movement of the rod lengthwise of its first portion and also for rocking movement of said rod relative to the floor about the principal axis of said first portion to adjust said guide, and means engaging said rod portion for clamping said rod in adjusted position.

7. For a pick-up baler of the type having a bale case disposed transversely of the direction of travel of such baler: a tail board comprising an inner floor adapted for disposition as substantially a continuation of the bale case to receive a bale moving laterally outwardly from said case, an outer chute portion extending rearwardly and downwardly from the inner floor portion and joined to said inner floor portion along a line forwardly and outwardly oblique to the direction of travel of the baler, and deflector means on the tail board above the level of the outer chute portion and substantially at the forward part of said line of joining and effective to intercept a laterally outwardly moving bale and to turn such bale rearwardly for discharge over said chute portion.

8. The combination set forth in claim 2, further characterized in that: the mounting means for the second guide element includes provision for fore and aft adjustment of said second guide element relative to the first guide element.

9. The combination set forth in claim 2, further characterized in that: the mounting means for the second guide element includes provision for transverse adjustment of the outer end of said second guide element relative to the outer end of the first guide element to selectively vary the transverse spacing between the outer ends of said elements.

10. A tail board for a pick-up type baler having a bale case disposed transversely of the direction of movement in the field, said tail board comprising a generally horizontal floor extending laterally from the discharge end of the bale case, the outer portion of the floor being inclined downwardly and rearwardly, a raised guide along the rear edge of said floor extending along said inclined portion, means mounting said guide on the tail board for fore and aft shifting and for lateral shifting relative to the floor, and means for securing a selected adjusted position of said guide.

FRANK D. JONES.
JAMES R. WEST.

REFERENCES CITED

The following references are of record in the file of this patent:

UNITED STATES PATENTS

| Number | Name | Date |
| --- | --- | --- |
| 483,678 | St. John | Oct. 4, 1892 |
| 699,235 | Ramsey et al. | May 6, 1902 |
| 862,504 | Nofzinger | Aug. 6, 1907 |
| 1,314,755 | Peterson | Sept. 2, 1919 |
| 1,495,459 | Thompson | May 27, 1924 |
| 1,758,208 | Warnecke | May 13, 1930 |
| 1,827,024 | Kisby | Oct. 13, 1931 |
| 2,230,038 | Jeromos | Jan. 28, 1941 |
| 2,318,229 | Jones | May 4, 1943 |
| 2,362,861 | Russell | Nov. 14, 1944 |